June 30, 1970 — R. L. BRIDGES ET AL — 3,517,629
TREE SEEDLING CAPSULE PLANTING TOOL
Filed Aug. 18, 1967 — 4 Sheets-Sheet 1
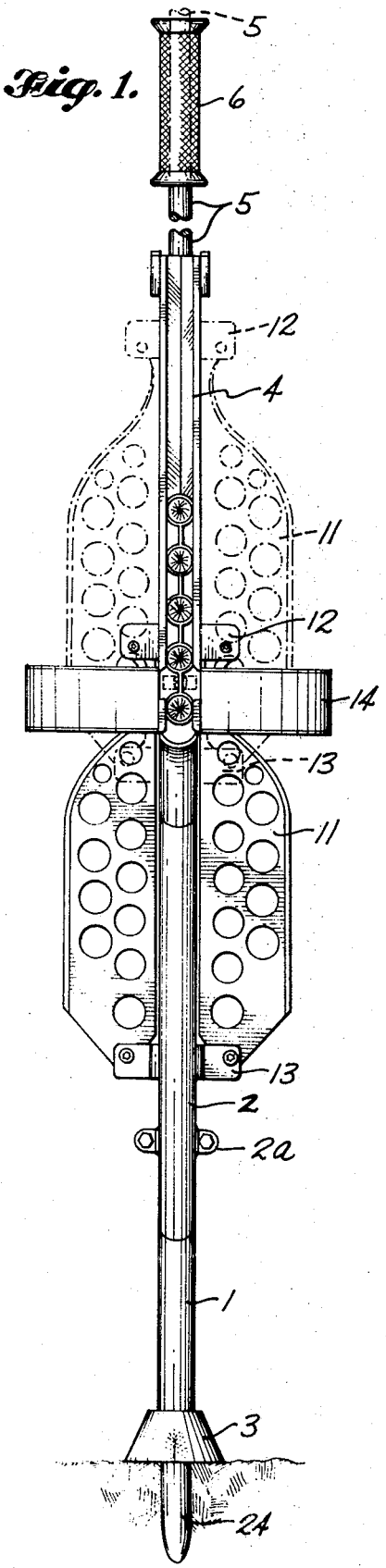
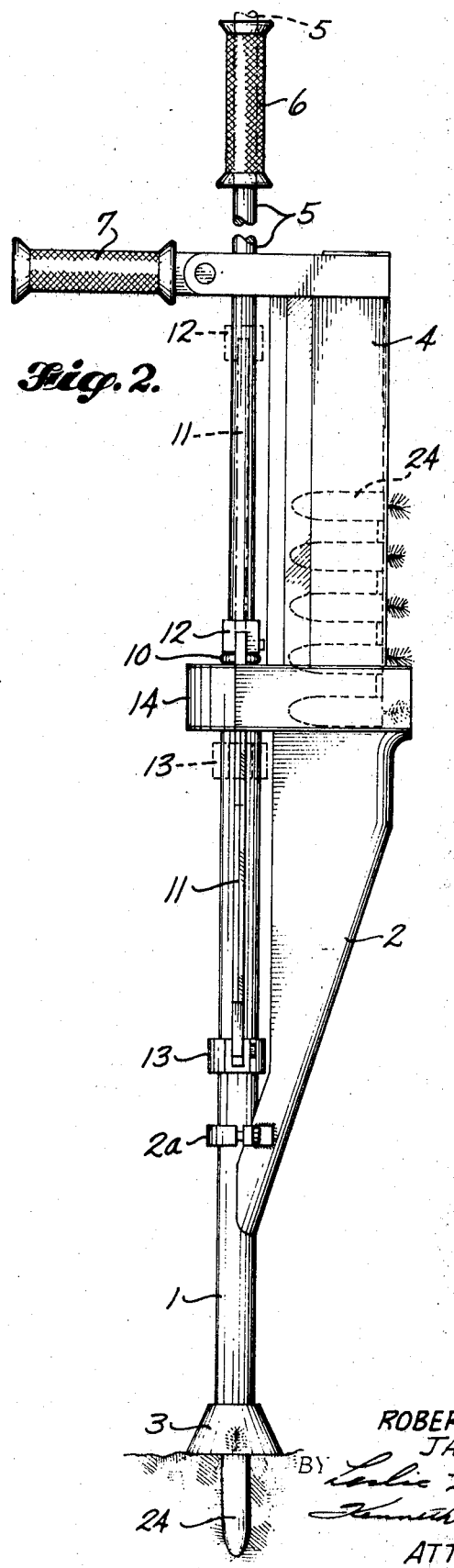
INVENTORS
ROBERT L. BRIDGES
JAMES DICK
BY
ATTORNEYS June 30, 1970 R. L. BRIDGES ET AL 3,517,629
TREE SEEDLING CAPSULE PLANTING TOOL
Filed Aug. 18, 1967 4 Sheets-Sheet 2
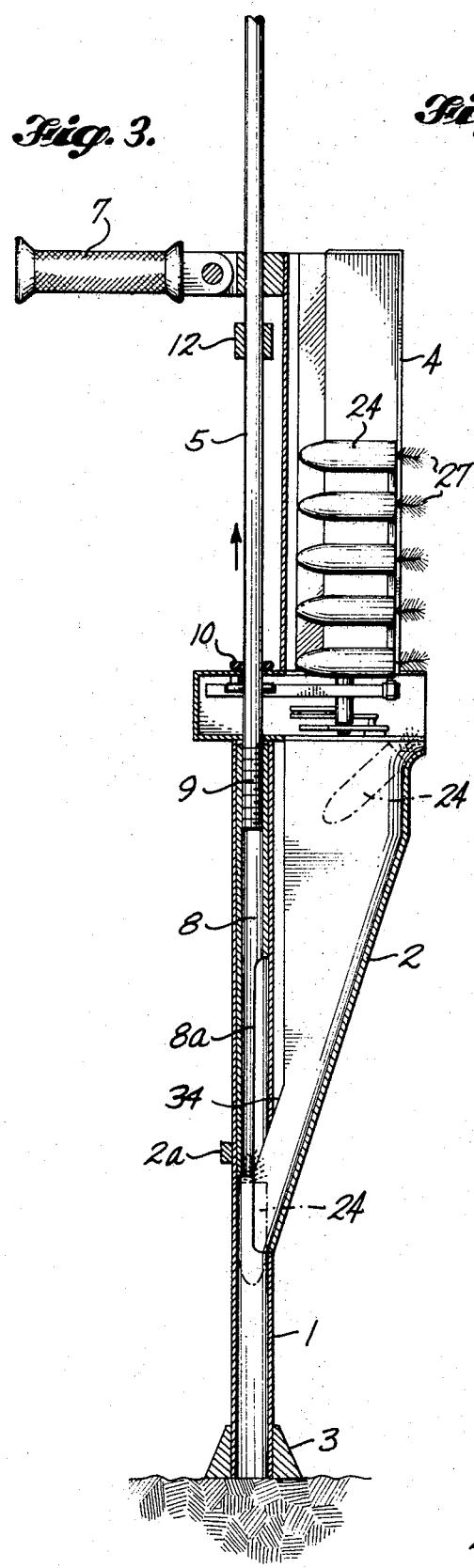
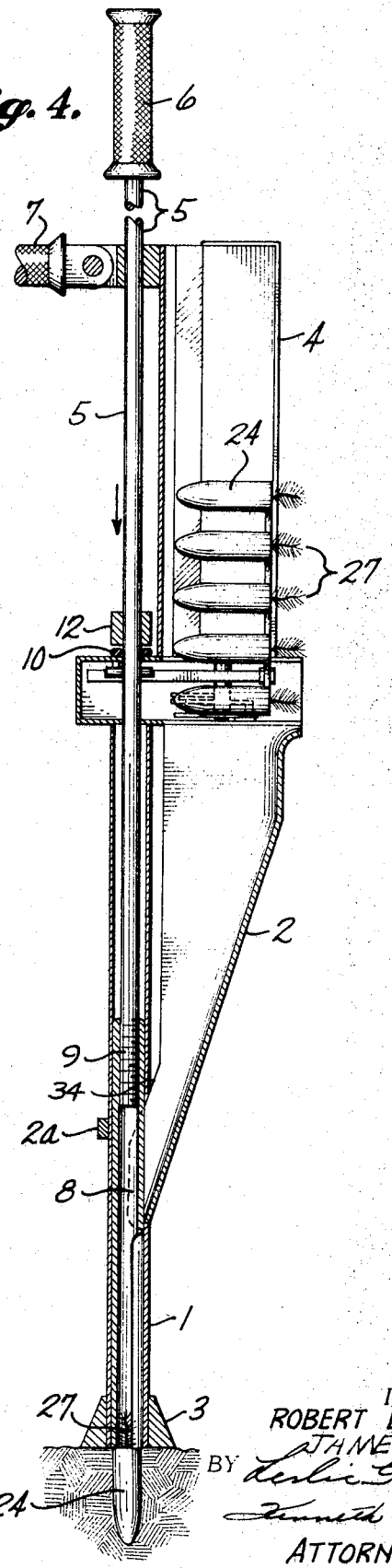
INVENTORS
ROBERT L. BRIDGES
JAMES DICK
BY
ATTORNEYS

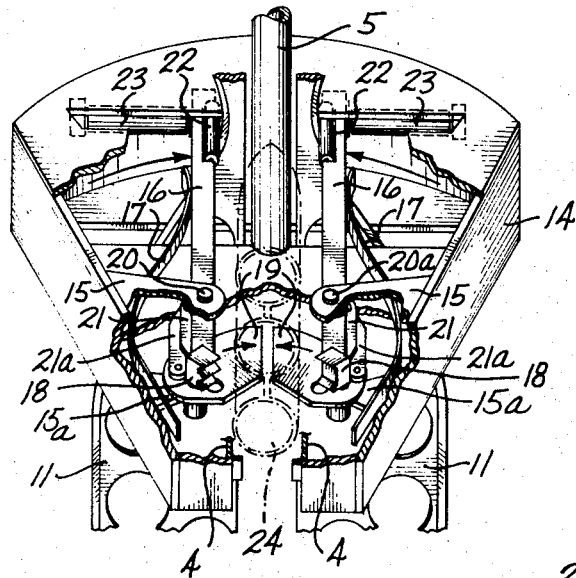
Fig. 5.
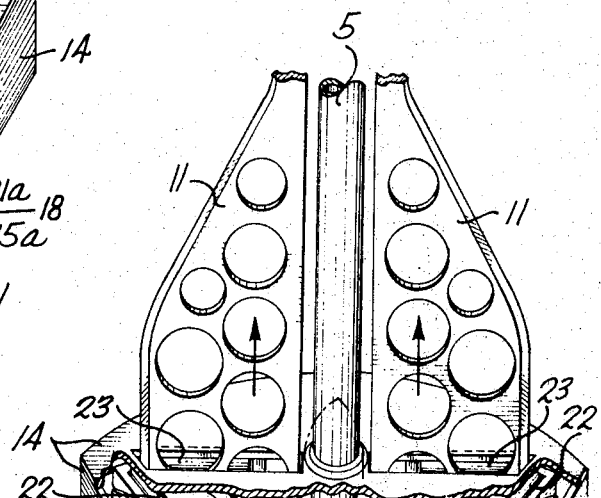
Fig. 6.
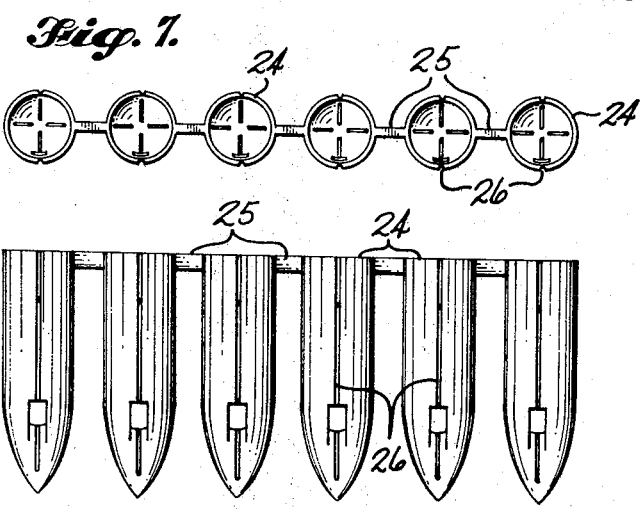
Fig. 7.
Fig. 8.
INVENTORS
ROBERT L. BRIDGES
JAMES DICK
BY
ATTORNEYS

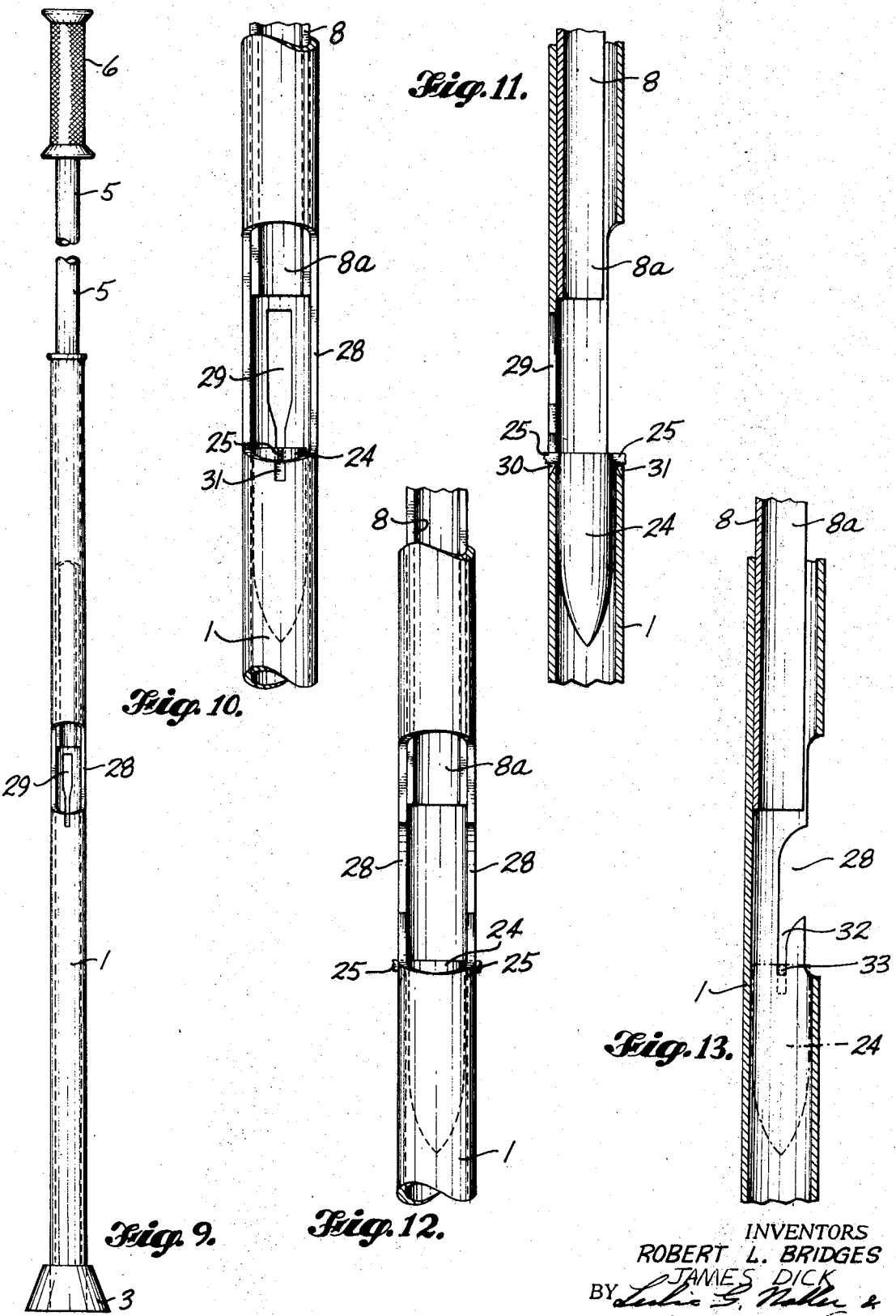

United States Patent Office 3,517,629
Patented June 30, 1970

3,517,629
TREE SEEDLING CAPSULE PLANTING TOOL
Robert L. Bridges, Kelso, and James Dick, Centralia, Wash., assignors to Weyerhaeuser Company, Tacoma, Wash., a corporation of Washington
Filed Aug. 18, 1967, Ser. No. 661,580
Int. Cl. A01c 5/02
U.S. Cl. 111—96     8 Claims

ABSTRACT OF THE DISCLOSURE

A tree planting tool for planting seedlings contained in plastic capsules, the tool comprising an elongated barrel having a diameter large enough to permit the plastic capsules containing the seedling to be pushed therethrough, a planting tube telescopically engaged within the barrel adapted to engage the top of the plastic capsule and force the capsule into the ground on the downward stroke of the planting tube, a receptacle for holding a series of capsules each separated by a web, a cutting mechanism for separating the capsules from each other and a feeding mechanism for preventing multiple feeding of capsules into the barrel for planting.

BACKGROUND OF THE INVENTION

Many methods have been devised for planting tree seedlings; however, most of the devices developed thus far are useful only for planting on level or semilevel areas. For planting on steep slopes, it is advantageous to have a device for planting seedlings which is both easy to operate and light in weight.

A tree planting tool has been devised for planting tree seedlings contained in plastic bullets. For example, see Canadian Pat. No. 694,803 wherein such a device is described. The apparatus of this invention, as distinguished from that described in the Canadian patent, is both lighter in weight and simpler in operation.

SUMMARY

This invention relates to an apparatus for planting tree seedlings, particularly on steep slopes and inaccessible locations where planting is desired. The invention comprises, in its broadest aspects, an apparatus having an elongated barrel of a diameter to allow a capsule containing a seedling to pass therethrough, the barrel having an opening on one side of a size to allow the passage of a capsule therethrough, an elongated planting tube capable of relative movement within the barrel and adapted to engage the top of the capsule containing the seedling to force it into the ground, a magazine for holding a series of capsules, each of the capsules held apart by a web, the magazine being positioned above and parallel to the barrel, a chute having one end positioned at the lowker end of the receptacle and the other end covering the opening in the barrel, the chute serving to convey a severed capsule from the magazine to the barrel, feeding and cutting means positioned at the lower end of the magazine. The feeding and cutting means are operatively connected to the planting tube so that when the tube is moved upward in relation to the barrel the web between the lower capsule in the magazine and the next lower capsule is severed by the cutting means and the capsule allowed to fall into the barrel by way of the chute. When the tube is moved downward in relation to the barrel the capsule is forced into the ground, the cutting means retracted, and the feeding means advanced to prevent multiple feeding of the remaining capsules in the magazine.

BRIEF DESCRIPTION OF THE DRAWINGS

FIG. 1 is a front elevation of the tree planting tool.
FIG. 2 is a side elevation of the tree planting tool.
FIG. 3 is a vertical cross section of the tree planting tool showing it in a "ready-to-plant" position.
FIG. 4 is a vertical cross section of the tree planting tool showing it in "planting" position.
FIGS. 5 and 6 are detailed fragmentary views of the cutting and feeding assembly.
FIG. 7 illustrates a top elevational view of a strip of the capsules useful in conjunction with the described invention.
FIG. 8 is a side elevation of the capsule strip of FIG. 7.
FIGS. 9–13 depict a modification of the planting tool holding only one capsule at a time.
FIG. 9 is a front elevation of the "single-shot" tool.
FIG. 10 is a fragmentary front elevation of the loading and cutting portion of FIG. 9.
FIG. 11 is a sectional side elevation of FIG. 10.
FIG. 12 is a front elevation of a modification of the loading and cutting portion of FIG. 9.
FIG. 13 is a sectional side elevation of FIG. 12.

DETAILED DESCRIPTION OF THE DRAWINGS

Referring now to FIGS. 1, 2, 3, and 4, the tree planting tool comprises a circular foot 3 attached to an elongated barrel 1. The internal diameter of the barrel should approximate the outside diameter of the capsules containing the seedlings. The circular foot prevents the barrel 1 from being driven into the ground during the planting operation and is tapered to prevent its catching on vines, limbs, or any other such similar obstructions. An opening 34 (FIGS. 3 and 4) is provided in the side of barrel 1 to permit loading of the capsules. The opening is large enough that the severed capsule containing the tree seedling can pass therethrough into position for planting. Over this opening is attached chute 2 which serves to deliver the severed capsules one at a time from magazine 4 to barrel 1. A planting tube 8 is telescopically fitted within barrel 1 as shown in FIGS. 3 and 4. The lower end of planting tube 8 is hollow. A slot 8a is cut in the planting tube and extends from the lower end contacting the capsule a distance exceeding the maximum expected foliage height above the capsule. This allows the planting tube 8 to make contact with the capsule without damage to the seedling stem. It also provides a place into which the foilage can fold while being driven down the barrel with virtually no foilage damage. The end of the planting tube 8 is designed to engage the outer radius of the capsule and force it into the ground. To the upper end of planting tube 8 is attached planting tube shaft 5 by means of attaching screw 9. To the planting tube shaft 5 is attached cam member 11 by means of clamp 12. A cam retaining ring 13 secures the cam member 11 at the lower end. The retaining ring 13 is slidable over barrel 1. Cam member 11 is preferably hollowed out as shown in order to lighten the weight of the overall planting tool.

The cutting and feeding assembly is attached to the barrel 1 at its upper end as shown in FIGS. 5 and 6. The cutting and feeding assembly holds and separates individual capsules from a unitary molded clip of capsules, and allows the separated capsules to fall into planting position by way of chute 2 into barrel 1. The cutting assembly (see FIGS. 5 and 6) comprises a pair of opposed cutting blades 18 horizontally positioned so that they will sever the web between each of the capsules. The cutting blades 18 are attached to one end of cutter arms 16. Cutter arm 16 rides against the surface of cam member 11. The cutter arms are pivotally mounted at 20 and 20a to flanges 15 and 15a extending from housing 14 and supported by the lower cover of housing 14. Springs 17, attached at one end to housing 14, press against cutter arms 16 to maintain them against the cam surface of cam member 11. Rollers 22 are preferably mounted on cutter arms 16 to lessen the friction between them and the surface of cam member 11. In addition cam backup or support rollers 23 are preferably mounted on housing 14 adjacent cam member 11 to lessen the friction involved in moving cam member 11. Rollers (not shown) may also be attached to the ends of cutter arms 16 opposite cutter blades 18 so as to bear against upper housing cover 14b to absorb the vertical portion of the cam thrust.

Stop plates 19 comprise a pair of opposed horizontally positioned plates pivoted to flanges 15a which, when the tool is in the "plant" position as shown in FIGS. 3 and 5, prevent the clip of capsules from entering chute 2. The stop plates are positioned below cutting blades 18 a distance such that the cutting blades, when brought into operation will sever the web between the bottom two capsules of the clip resting on stop plates 19. The stop plates are operatively connected to cutter arms 16 by arms 21 and linkages 21a. As cutter arms 16 are retracted by movement of cam member 11, stop plates 19 are moved into the thus formed opening and prevent the capsules remaining in magazine 4 from falling into chute 2 and barrel 1. Stabilizer fingers may be provided to prevent the last capsule from falling directly behind the second to the last caspule into chute 2.

FIGS. 8 to 12 depict a modification of the multiple planting device previously described. The "single-shot" planting device in FIGS. 8 to 12 is much lighter in weight and can be used with a clip of capsules such as depicted in FIGS. 7 and 8. The "single-shot" device comprises a circular foot 3 attached to an elongated barrel 1 having an opening 28 large enough to allow passage of the capsule containing the tree seedling therethrough. Planting tube 8 attached to shaft 5 is telescopically fitted within barrel 1 as described previously. The lower end of the planting tube 8 has a slot 8a which extends from the lower end contacting a capsule a distance exceeding the maximum expected foliage height above the capsule.

Referring now to FIGS. 10 and 11, within the wall of barrel 1 adjacent the opening 28 is cut a slot 29 of a size large enough to allow easy insertion of web 25 of the clip of capsules. The lower edge 30 of the slot 29 and the corresponding edge 31 of the opening directly across from the slot are sharpened so that the webs holding the capsules 24 together can be easily severed on downward thrust of planting tube 8 by the operator.

FIGS. 12 and 13 depict a modification of the loading and cutting portion of the "single-shot" planting tool. In this modification a slot 32 cut in the opening of barrel 1 is provided with sharpened edges 33 which sever the capsule from the remaining capsules in the clip on downward thrust of planting tube 8. This "single-shot" planting tool is of reduced weight and complexity and can serve a useful purpose in planting of tree seedlings.

OPERATION OF THE TOOL

To operate the tool a clip of capsules 24 each separated by a web 25, as shown in FIG. 7, is placed in magazine 4 so that the lower capsule is resting on stop plates 19. When the planting tube handle 6 is pulled upward in relation to the barrel 1 cam member 11 is moved upward and causes cutter arms 16 to separate. This action withdraws stop plates 19. Cutting blades 18 are also moved toward each other and act to sever the web between the lower and next to lower capsule. As the web is severed the severed capsule drops into chute 2 and finally into barrel 1. The web between the capsules is held by cutting blades 18. As the planting tube 8 is moved downward in relation to the barrel 1 by the person operating the tool, the hollow portion of planting tube 8 engages the capsule and presses it into the ground (See FIG. 4). At the same time cam member 11 is moved back into its original position returning the cutter arms 16 and cutting blades 18 to their original positions. This same action advances stop plates 19 so that the remaining capsules in receptacle 4 cannot fall into chute 2. The web held by cutting blades 18 is released and falls to the ground by going through the chute or by dropping out the front of the cutter housing. Cutting blades 18 and optionally stabilizer fingers, support the capsule clip until stop plates 19 are sufficiently in position to prevent the clip from feeding through. A platform may be provided at the top of chute 2 which runs across the bottom of housing 14. This platform should extend under the edge of the capsule so that when the capsule is cut it rotates on the edge of the platform and thereby falls down the chute with the foliage end up. This platform can be slanted down and toward the outside so that the webbing pieces cannot gather on it and jam operation of the tool.

The tree planting tool of this invention is preferably manufactured from light metal such as aluminum so that it can be used in an optimum manner. The particular device described according to this invention weighs slightly more than 10 lbs. and is advantageously used in planting great numbers of tree seedlings in a short amount of time.

What is claimed is:
1. A tool for planting tree seedlings which comprises:
   (a) an elongated barrel whose inside diameter approximates the outside diameter of a capsule containing a tree seedling, the barrel having an opening on one side large enough to allow passage of the capsule and seedling therethrough,
   (b) an elongated planting tube telescopically mounted within the barrel and capable of relative movement within the barrel, at least the lower end of the planting tube being hollow to receive the seedling and adapted to engage the top of the capsule to force it into the ground,
   (c) a magazine mounted adjacent to and above the opening in the barrel for holding a series of capsules, each of the capsules connected by a web member,
   (d) feeding and cutting means positioned at the lower end of the magazine for alternately blocking and unblocking the path of said capsules and for severing individual capsules from said series of capsules,
   (e) a cam member attached at its upper end to the planting tube and slidably mounted for up and down movement along said barrel, the cam member having cam surfaces narrow at the upper end and wider at its lower end, with said surfaces being operatively connected to the feeding and cutting means for blocking said capsules by a downward movement of said planting tube and severing between said capsules by an upward movement of said planting tube, and
   (f) a chute interconnecting the magazine and the opening in the barrel for conveying the severed capsule from the cutting means to the barrel.
2. The tool according to claim 1 wherein the planting tube has a slot in its lower end adapted to allow a capsule containing a seedling to easily fall into the barrel without damage to the foliage extending from the capsule.
3. The tool according to claim 1 wherein the cutting means comprises a pair of horizontally opposed, spring-based cutting arms pivotally mounted on each side of the lower portion of the magazine, cutting blades mounted on one end of each of the cutting arms adapted to sever the web between the lowest capsule and the next to lowest capsule of the series in the magazine, the opposite end of the cutting arms being in contact with the cam surfaces.
4. The tool according to claim 1 wherein the feeding means comprises a pair of horizontally opposed stop plates pivotally mounted on each side of the lower portion of the magazine and operatively connected to the cutting means, the stop plates adapted to retain all but the severed capsule of the series of capsules in the magazine on release of the cutting blades.

5. The tool according to claim 1 wherein, when the cam member is moved upward in relation to the barrel the feeding means and cutting means are moved in opposing relation.

6. The tool according to claim 1 wherein a handle is mounted on the upper end of the planting tube.

7. The tool according to claim 1 wherein a foot is mounted on the bottom of the barrel adapted to engage the ground.

8. The tool according to claim 1 wherein a handle is affixed horizontally to the barrel for steadying the tool during operation.

References Cited

FOREIGN PATENTS

| | | |
|---|---|---|
| 694,803 | 9/1964 | Canada. |
| 1,013,583 | 4/1952 | France. |
| 899,792 | 6/1962 | Great Britain. |
| 407,315 | 9/1944 | Italy. |

ROBERT E. PULFREY, Primary Examiner

A. E. KOPECKI, Assistant Examiner

U.S. Cl. X.R.

221—69